(12) United States Patent
Glatfelter et al.

(10) Patent No.: US 10,519,614 B2
(45) Date of Patent: Dec. 31, 2019

(54) SYSTEM AND METHOD FOR AUTOMATED DEPLOYMENT OF A PASSENGER BOARDING BRIDGE

(71) Applicant: The Boeing Company, Chicago, IL (US)

(72) Inventors: John W. Glatfelter, Kennett Square, PA (US); Brian D. Laughlin, Wichita, KS (US)

(73) Assignee: TEH BOEING COMPANY, Chicago, IL (US)

( * ) Notice: Subject to any disclaimer, the term of this patent is extended or adjusted under 35 U.S.C. 154(b) by 0 days.

(21) Appl. No.: 15/633,540

(22) Filed: Jun. 26, 2017

(65) Prior Publication Data

US 2018/0371712 A1    Dec. 27, 2018

(51) Int. Cl.
*B64F 1/00* (2006.01)
*E01D 15/00* (2006.01)
*B64F 1/305* (2006.01)

(52) U.S. Cl.
CPC ............ *E01D 15/005* (2013.01); *B64F 1/305* (2013.01)

(58) Field of Classification Search
CPC .............................. E01D 15/005; B64F 1/305
USPC ................................................. 14/69.5–71.5
See application file for complete search history.

(56) References Cited

U.S. PATENT DOCUMENTS

| 3,588,934 | A | * | 6/1971 | Van Marie | B64F 1/305 135/115 |
| 3,683,440 | A | * | 8/1972 | Xenakis | B64F 1/3055 14/71.5 |
| 5,105,495 | A | * | 4/1992 | Larson | B64F 1/305 14/71.5 |
| 6,487,743 | B1 | | 12/2002 | Nicoletti | |
| 6,684,443 | B2 | * | 2/2004 | Thomas | B64F 1/305 14/69.5 |
| 6,745,423 | B1 | * | 6/2004 | Hutton | B64F 1/3055 14/71.5 |
| 7,120,959 | B2 | * | 10/2006 | Hutton | B64F 1/305 14/71.5 |
| 7,137,162 | B2 | * | 11/2006 | Spencer | B64F 1/002 14/71.5 |
| 7,168,119 | B1 | * | 1/2007 | Telford | B64F 1/3055 14/71.5 |

(Continued)

*Primary Examiner* — Raymond W Addie
(74) *Attorney, Agent, or Firm* — Moore IP Law (57) ABSTRACT

A system and method for controlling the movement of an extendible bridge structure has proximity sensors coupled to a distal end thereof and includes a first movement mechanism for extension and retraction thereof. A processor receives signals from the proximity sensors and, based thereon, selectively generates and provides control signals to the first movement mechanism to automatically extend the structure to a predetermined position against a vehicle positioned in a predetermined area. A flexible boot is attached to the distal end of the structure. The processor generates and provides control signals to a second movement mechanism coupled to the flexible boot to extend the flexible boot against the vehicle. The processor also monitors and identifies any changes in a positional relationship between the flexible boot and the vehicle after initial extension thereof and provides generated control signals to the first movement mechanism to restore the structure to the predetermined position.

17 Claims, 6 Drawing Sheets

(56) References Cited

U.S. PATENT DOCUMENTS

| | | | |
|---|---|---|---|
| 7,458,122 B2* | 12/2008 | Hutton | B64F 1/305 |
| | | | 14/71.5 |
| 9,746,846 B1* | 8/2017 | Truscott | G05B 19/124 |
| 2003/0120358 A1* | 6/2003 | Hutton | B64F 1/3055 |
| | | | 700/13 |
| 2003/0145403 A1* | 8/2003 | Hutton | B64F 1/305 |
| | | | 14/71.5 |
| 2008/0229525 A1* | 9/2008 | Hutton | B64F 1/002 |
| | | | 14/71.5 |
| 2009/0119854 A1* | 5/2009 | Nelson | A61B 18/1492 |
| | | | 14/71.5 |

* cited by examiner

SYSTEM AND METHOD FOR AUTOMATED DEPLOYMENT OF A PASSENGER BOARDING BRIDGE

FIELD

This disclosure relates generally to a system and method for automated deployment and positioning of a passenger boarding bridge.

BACKGROUND

The ability to rapidly load and unload passengers from commercial aircraft is a constant concern to commercial airlines and airport management. An increase in commercial airline use by the traveling public places more stress on the finite capabilities of airports to handle increasing passenger traffic. To handle this increasing passenger traffic, an increasing number of arriving and departing aircraft are scheduled to operate at airports having a limited number of gates. To better move the increasing passenger traffic with more aircraft requires a significant improvement in the ability to timely unload and then load passengers, thereby reducing the disembarking and embarking times of the aircraft (the "turn time").

A "passenger boarding bridge" is an enclosed, movable connector which typically extends from an airport terminal gate to an aircraft, or from a port to a ship, allowing passengers to board and disembark without having to go outside and be exposed to the elements. A passenger boarding bridge is alternatively called a jet bridge, jetway, gangway, aerobridge/airbridge, air jetty, portal, or skybridge. At most airports, the passenger boarding bridge associated with each gate is movable, extending into position to mate with the aircraft once the aircraft is parked at the gate and retracting once disembarking and/or boarding is complete.

Each passenger boarding bridge typically includes a walkway portion and a cabin at the end adjacent to the aircraft. The cabin may be raised or lowered, extended or retracted, and may pivot, to accommodate aircraft of different sizes. In addition, a flexible boot is mounted to the cabin which is extended against the aircraft once the cabin is in position to eliminate any gaps between the aircraft and cabin and maintain passenger safety in boarding and disembarking. The positioning of the cabin and the flexible boot is controlled manually at an operator's station in the cabin by an airport employee. It often can take a significant amount of time for an airport employee to position the passenger boarding bridge once an aircraft is parked at the gate (e.g., during busy times at the airport), leading to delays in disembarking and subsequent boarding and adversely affecting turn time. In addition, as an aircraft is unloaded and then reloaded, the change in weight can cause the aircraft to shift position significantly vertically, causing gaps to form between the aircraft and the cabin/flexible boot and requiring repositioning of the cabin and/or flexible boot.

Accordingly, there is a need for a system and method for deployment and positioning of a passenger boarding bridge which overcomes the problems recited above.

SUMMARY

In a first aspect, a system for controlling the movement of an extendible bridge structure has one or more proximity sensors coupled to a distal end of the extendible bridge structure. The system also has a first movement mechanism for extending and retracting the extendible bridge structure. Finally, the system has a processor for receiving signals from the one or more proximity sensors and, based thereon, selectively generating and providing control signals to the first movement mechanism to automatically extend the extendible bridge structure to a predetermined position against a vehicle positioned in a predetermined area.

In one further embodiment, a flexible boot may be attached to the distal end of the extendible bridge structure. The processor may generate and provide control signals based on the received signals to a second movement mechanism coupled to the flexible boot to extend the flexible boot against the vehicle. Still further, the processor may monitor and identify, based on the signals from the proximity sensors, any changes in a positional relationship between the flexible boot and the vehicle after the flexible boot is initially extended against the vehicle. The processor may also generate control signals, based on any identified changes in the positional relationship, to restore the extendible bridge structure to the predetermined position against the vehicle. Finally, the processor may provide the generated control signals to the first movement mechanism.

In another further embodiment, the processor may receive a retraction signal to initiate retraction of the extendible bridge structure and provide, based on receipt of the retraction signal, control signals to the first movement mechanism to retract the extendible bridge structure away from the vehicle to a predetermined initial position.

In yet another further embodiment, one or more position sensors may be coupled to a distal end of the extendible bridge structure. The processor may receive signals from the position sensors, determines, based on the signals from the position sensors, when a vehicle comes to rest in the predetermined area, and, based on such determination, initiates the automatic extension of the extendible bridge structure.

In yet another further embodiment, an antenna may be coupled to the processor, The processor may receive an activation signal via the antenna and, based on such activation signal, initiate the automatic extension of the extendible bridge structure.

In a still further embodiment, a network interface card may be coupled to the processor, the network interface card having an external interface coupled to a computer network. The processor may initiate the automatic extension of the extendible bridge structure based on an initiation signal received over the computer network via the network interface card.

Finally, the proximity sensors may be vision sensors, radar sensors, optical sensors, LIDAR sensors, passive RFID sensors, active RFID sensors, or blue-tooth sensors.

In a second aspect, a system for controlling the movement of a passenger boarding bridge is provided. One or more proximity sensors are coupled to an outer surface of a cabin mounted at a distal end of the passenger boarding bridge. A first movement mechanism for extending and retracting the cabin is provided at the distal end of the passenger boarding bridge. A processor receives signals from the one or more proximity sensors and, based thereon, selectively generates and provides control signals to the first movement mechanism to automatically extend the cabin to a predetermined position against an aircraft positioned in a predetermined area.

In a third aspect, a method for controlling the movement of an extendible bridge structure having a first movement mechanism for extending and retracting the extendible bridge structure. A signal is received to initiate extension of the extendible bridge structure. Signals are received from one or more proximity sensors coupled to a distal end of the extendible bridge structure. Control signals are generated and provided based on the received signals to the first movement mechanism to extend the extendible bridge structure to a predetermined position against a vehicle positioned in a predetermined area.

In one further embodiment, a flexible boot may be attached to the distal end of the extendible bridge structure. Control signals may be generated and provided based on the received signals to a second movement mechanism coupled to the flexible boot to extend the flexible boot against the vehicle. Further, based on the signals from the proximity sensors, any changes in a positional relationship between the flexible boot and the vehicle after the flexible boot is initially extended against the vehicle may be monitored and identified. Control signals may be generated, based on any identified changes in the positional relationship, to restore the extendible bridge structure to the predetermined position against the vehicle. The generated control signals may be provided to the first movement mechanism. Finally, a retraction signal may be received to initiate retraction of the extendible bridge structure. Based on the retraction signal, control signals may be provided to the first movement mechanism to retract the extendible bridge structure away from the vehicle to a predetermined initial position.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

The present disclosure is addressed to an automated deployment system for a passenger boarding bridge that enables the movable bridge structure to move toward a parked aircraft in a safe manner until fully docked. This system streamlines the process of accurately positioning the cabin of the passenger boarding bridge adjacent to the aircraft and automatically adapts to the numerous different types of aircraft in use. Because the system employs sensors for determining positioning information, the system also ensures that no inadvertent contact with adjacent infrastructures and other movable obstacles (e.g., parked vehicles) will occur when deploying the passenger boarding bridge. The use of such sensors ensure that the passenger boarding bridge is consistently and accurately docked to each aircraft in an efficient manner and without any need for repositioning and the subsequent additional delay in turn time caused by such repositioning. In addition, an aircraft can move up and down vertically significantly while parked at a gate as the loaded weight of the aircraft changes while being unloaded and then loaded again (of both cargo and passengers). The system and method of the present disclosure continuously monitors the position of the cabin against the aircraft and, based on that monitoring, moves the cabin to maintain a close position as the aircraft moves vertically up and down during disembarking and boarding. This capability thus improves the safety of passengers and crew during boarding or disembarking by eliminating any gaps that might occur between the aircraft and the cabin as the aircraft is unloaded. Furthermore, since the movement patterns of the cabin as it is extended and retracted are repeatable and predictable given the automated control of such movement, less space is required and other service vehicles may use areas located closer to the aircraft, making servicing the aircraft faster and easier.

Figure 1:
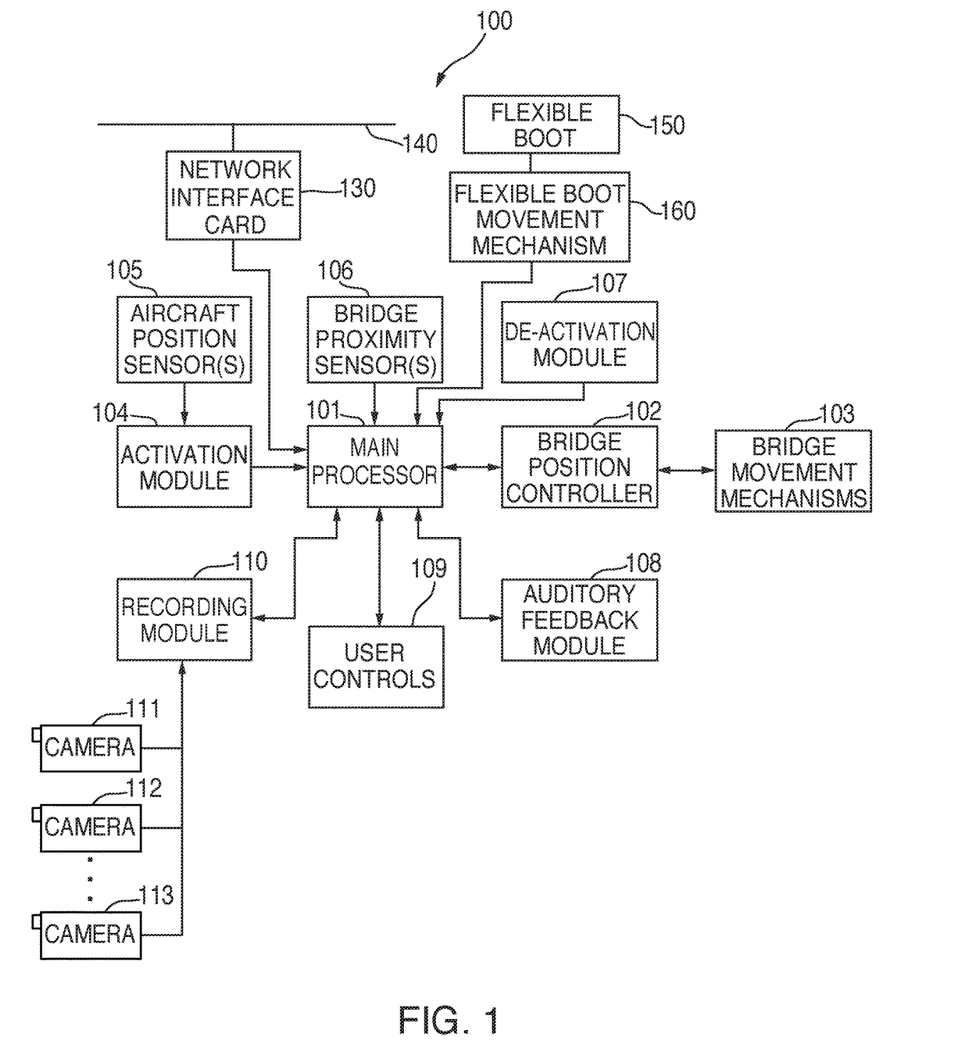
FIG. 1 is a block diagram of an automated deployment system for a passenger boarding bridge according to an embodiment of the present disclosure.

Referring now to FIG. 1, a system 100 for the automated deployment of a passenger boarding bridge is shown in block diagram format. System 100 includes a main processor 101 that is coupled to a passenger boarding bridge position controller 102, which in turn is coupled to a passenger boarding bridge movement mechanism 103. The passenger boarding bridge movement mechanism 103 includes all the motors (or other drive elements) and steering elements necessary to cause the cabin (e.g., cabin 201 in FIGS. 2A and 2B) of the passenger boarding bridge (e.g., passenger boarding bridge 200 in FIGS. 2A and 2B) to move in three dimensions, i.e., to extend and retract (horizontally) towards and away from an aircraft (e.g., aircraft 210 in FIGS. 2A and 2B), to move up and down vertically with respect to the aircraft, and to move right and left horizontally in a direction perpendicular to the aircraft. Passenger boarding bridge position controller 102 receives signals from the main processor 101 relative to the desired movement of the cabin and translates such signals to those required by the motors (or other drive elements) and steering elements forming passenger boarding bridge movement mechanism 103 to achieve the desired movement. In some embodiments, passenger boarding bridge position controller 102 may be incorporated into main processor 101. A flexible boot 150 is coupled to the distal end of the cabin, and a separate movement mechanism 160 is coupled to flexible boot 150 which includes the separate motors (or other drive elements) used to extend (or retract) the flexible boot 150 (shown as flexible boot 305 in FIG. 3B), based on signals from main processor 101 via passenger boarding bridge position controller 102, against (or away from) an aircraft 310 (FIG. 3B).

A set of passenger boarding bridge proximity sensors 106 are mounted to an exterior surface of the cabin that faces towards the aircraft (i.e., sensors 106 are mounted to the distal end of the cabin) and are each coupled to the main processor 101. Each of the passenger boarding bridge proximity sensors 106 are used to measure the distance between the aircraft and the cabin. Passenger boarding bridge proximity sensors 106 may be vision sensors, radar sensors, optical sensors, LIDAR sensors, passive RFID sensors, active RFID sensors, blue-tooth sensors or other sensors that can provide a proximity measurement. In a further embodiment, markers may be attached to each aircraft to cooperate with the passenger boarding bridge proximity sensors 106 and ensure that accurate proximity measurements are generated.

An activation module 104 is also coupled to the main processor 101. The activation module 104 causes the initiation of the extension of the passenger boarding bridge towards the aircraft. One or more aircraft position sensors 105 may be coupled to the activation module 104. The aircraft position sensors 105 monitor the aircraft parking area adjacent to the passenger boarding bridge and provide signals to activation module 104 that allows an automatic determination when an aircraft has come to rest in the aircraft parking area. In one alternative embodiment, an antenna 120 may be coupled to activation module 104 that can receive a signal from a transmitter in the aircraft indicating that the aircraft has come to rest in the aircraft parking area. In some embodiments, activation module 104 may be incorporated into main processor 101 and optional antenna 120 may be coupled directly to processor 101 (via an appropriate receiver, etc.) to provide the activation signal. In another embodiment, processor 101 is coupled to an airport network 140 via a network interface card 130 and the activation signal is received at processor 101 received via a network communication over network 140 and received by network interface card 130. This network communication may be communicated from the control tower or from the aircraft itself (e.g., via a wireless network interface).

User controls 109 are also coupled to main processor 101. User controls 109 may be used to disable automatic movement and to manually position the cabin. User controls 109 can also be used to initiate the automatic extension and/or the automatic retraction of the cabin.

A deactivation module 107 is also coupled to main processor 101. The deactivation model 107 includes sensors mounted on the exterior surface of the cabin (facing the aircraft) which detect when the cabin is directly adjacent to the aircraft. The signal from deactivation module 107 to main processor 101 causes the extension process phase to stop and initiates the micro-adjustment positioning phase (as discussed below with respect to FIGS. 3A to 3C and 4).

In a further embodiment, one or more cameras 111, 112, 113 may be mounted on an exterior portion of the cabin to monitor the extension and retraction of the cabin. The cameras 111, 112, 113 are coupled to a recording module 110 that is, in turn, coupled to main processor 101. Recording module 110 is preferably activated based on a signal from main processor 101 (e.g., when extension or retraction is initiated). Recording the extension and/or retraction sequence may be used, for example, to enable continuous process improvement and/or to maintain flight safety records.

In another further embodiment, an auditory feedback module 108 may be provided which is coupled to the main processor 101 and which provides an auditory signal during the extension and retraction of the cabin. Further, an initial different auditory signal may be provided signaling the initiation of extension or retraction.

Figure 2A:
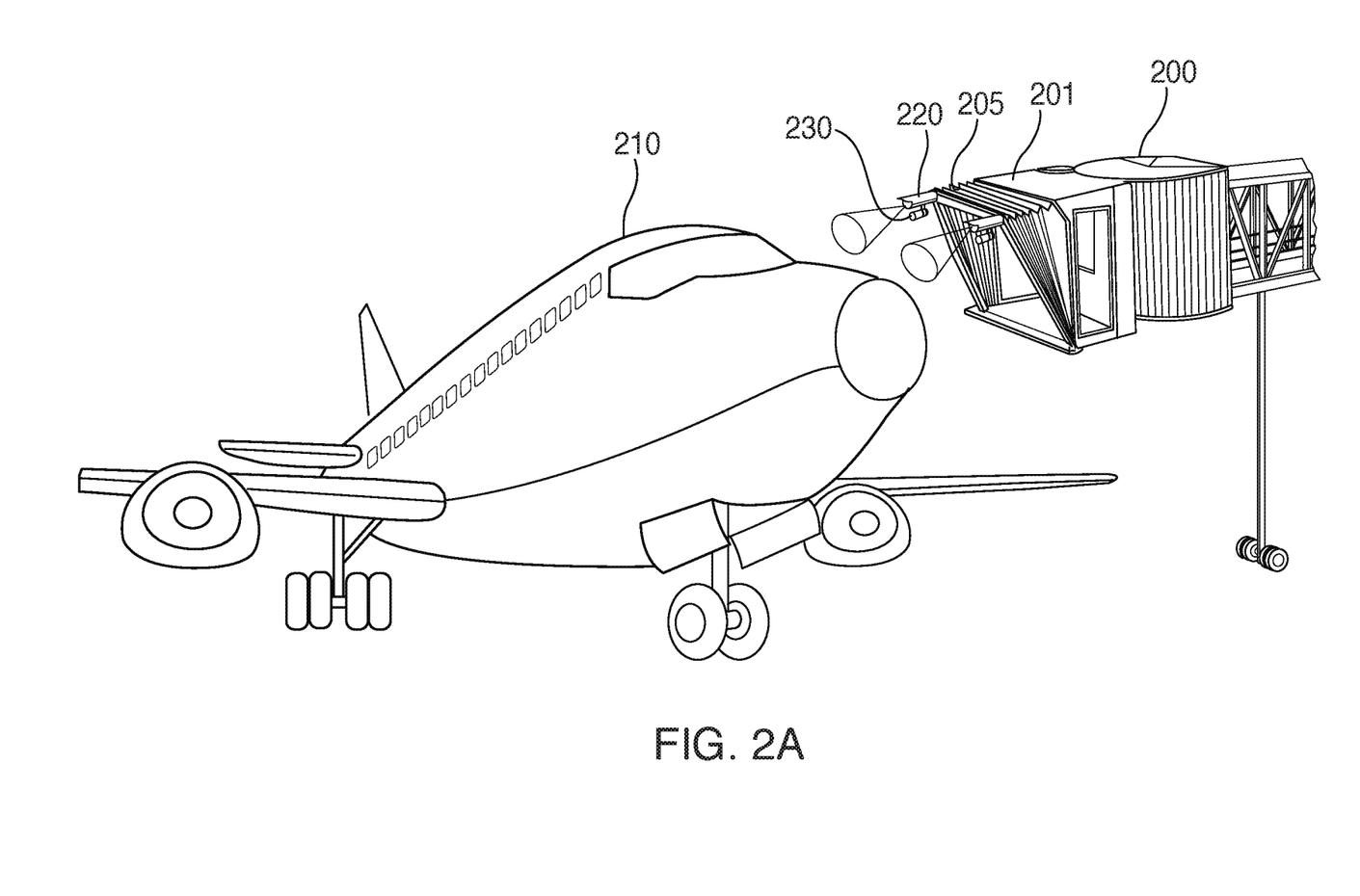
FIG. 2A is a diagram of the automated deployment system for a passenger boarding bridge with the passenger bridge in a retracted position according to an embodiment of the present disclosure.
Figure 2B:
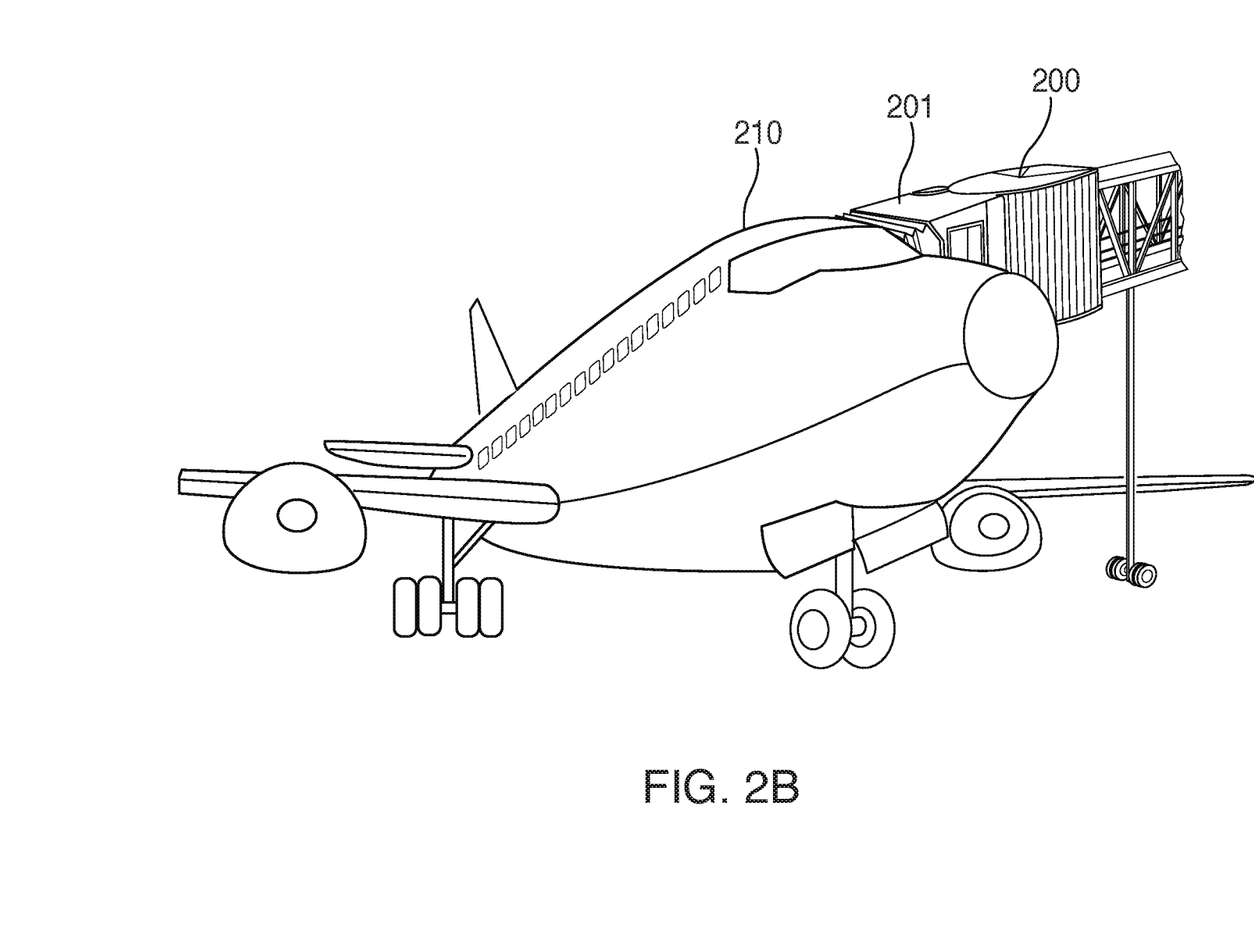
FIG. 2B is a diagram of the automated deployment system for a passenger boarding bridge with the passenger bridge in an extended position according to an embodiment of the present disclosure.

Referring now to FIGS. 2A and 2B, a passenger boarding bridge 200 is shown having a cabin 201 in a retracted and extended position, respectively, with respect to an aircraft 210. A flexible boot 205 is mounted on the periphery of the outer surface of cabin 201 (i.e., the surface facing aircraft 210). In addition, sensors 220 and, optionally as discussed above, cameras 230 are mounted along the outer surface of cabin 201. Sensors 220 correspond to passenger boarding bridge proximity sensors 106 in FIG. 1 while cameras 230 correspond to cameras 111, 112, 113 in FIG. 1. Although not shown separately, sensors 220 may also include the sensors used by deactivation module 107 as discussed above.

Figure 3A:
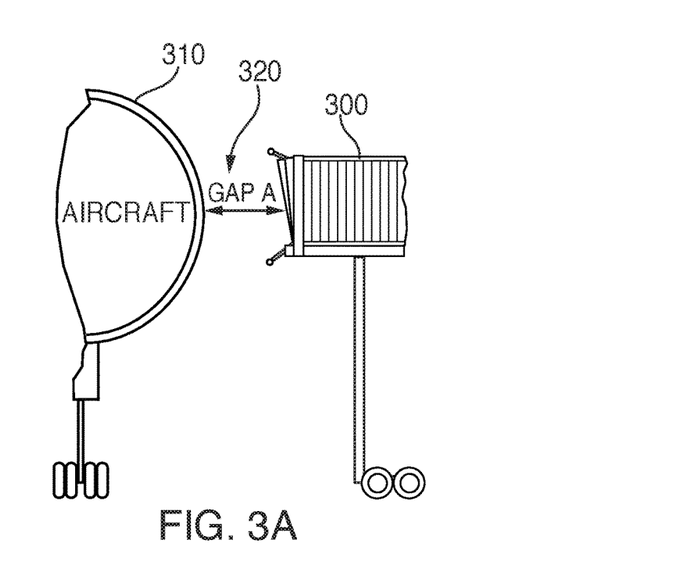
FIG. 3A is a diagram illustrating a first set of monitored gaps between the passenger boarding bridge and an aircraft for use with the automated deployment system of the present disclosure.
Figure 3B:
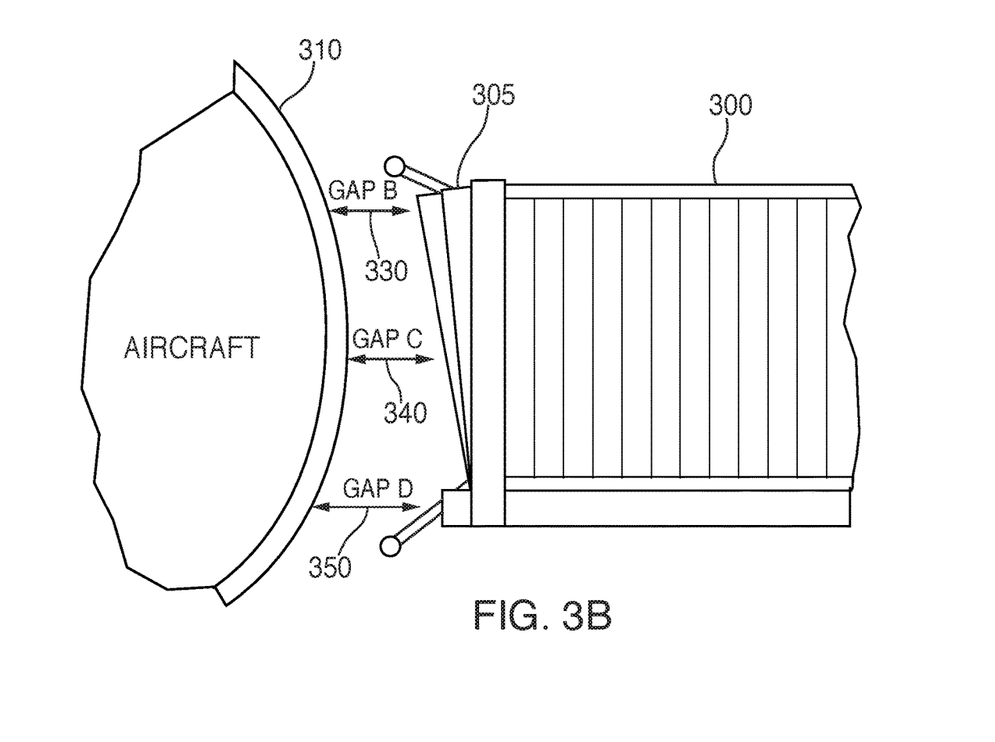
FIG. 3B is a diagram illustrating a second set of monitored gaps between the passenger boarding bridge and an aircraft for use with the automated deployment system of the present disclosure.
Figure 3C:
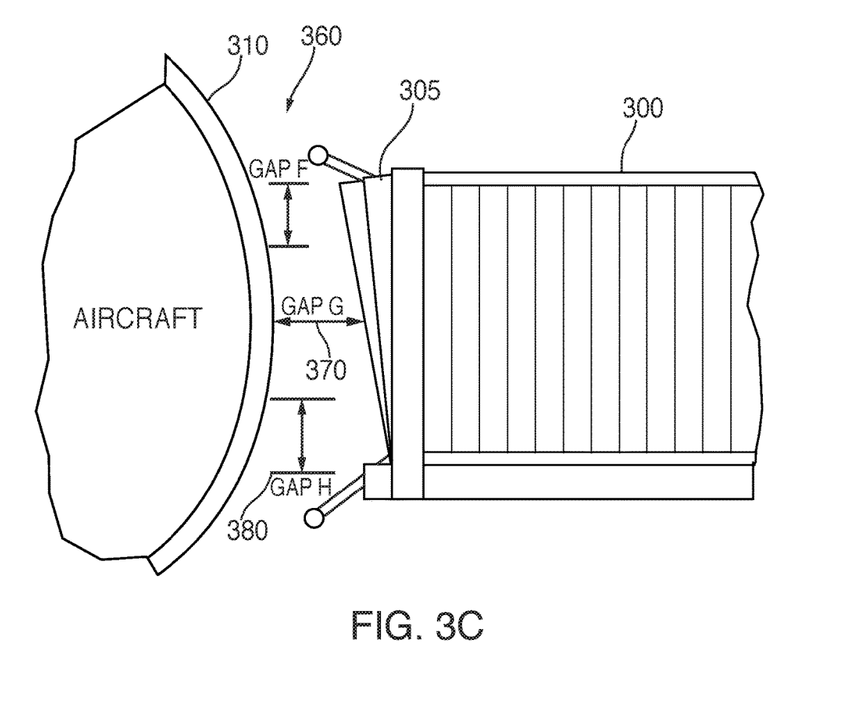
FIG. 3C is a diagram illustrating a third set of monitored gaps between the passenger boarding bridge and an aircraft for use with the automated deployment system of the present disclosure.

Referring now to FIGS. 3A, 3B, and 3C, system 100 in FIG. 1 uses sensors (e.g., passenger boarding bridge proximity sensors 106 in FIG. 1) to track the movement of the cabin at the aircraft end of passenger boarding bridge 300 as bridge 300 is extended towards an aircraft 310. There are a number of key spaces (or gaps) that are monitored by the sensors. In particular, as shown in FIG. 3A, Gap A 320 is the distance between the outer edge of the cabin of passenger boarding bridge 300 and the outer surface of aircraft 310. In addition, as shown in FIG. 3B, Gap B 330 is the distance between the upper portion of a flexible boot 305 mounted to the outer edge of the cabin of the passenger boarding bridge 300 and the aircraft 310. Further, Gap C 340 is the distance between the middle portion of flexible boot 305 (in a retracted position) and aircraft 310. Finally, Gap D 350 is the distance between the bottom portion of flexible boot 305 and aircraft 310. Finally, as shown in FIG. 3C, Gap F 360 is the distance between the actual upper edge of flexible boot 305 and the expected position on the aircraft for the upper edge of flexible boot 305. Gap G 370 is the distance between the actual middle edge of flexible boot 305 and the expected position on the aircraft for the upper edge of flexible boot 305. Gap H is the distance between the actual lower edge of flexible boot 305 and the expected position on the aircraft for the lower edge of flexible boot 305. The expected position may be determined, for example, by the relationship of markings on the aircraft and the initial position of flexible boot 305 after docking is complete (i.e., the initial extension process including the extension of the flexible boot). Alternatively, the expected position may be determined using geometric methods such as an RMS best-fit analysis of lateral, vertical, and longitudinal sensors to the body of the aircraft or a vision-driven shape analysis of the aircraft door to determine positive target location based on proximity sensor input.

Figure 4:
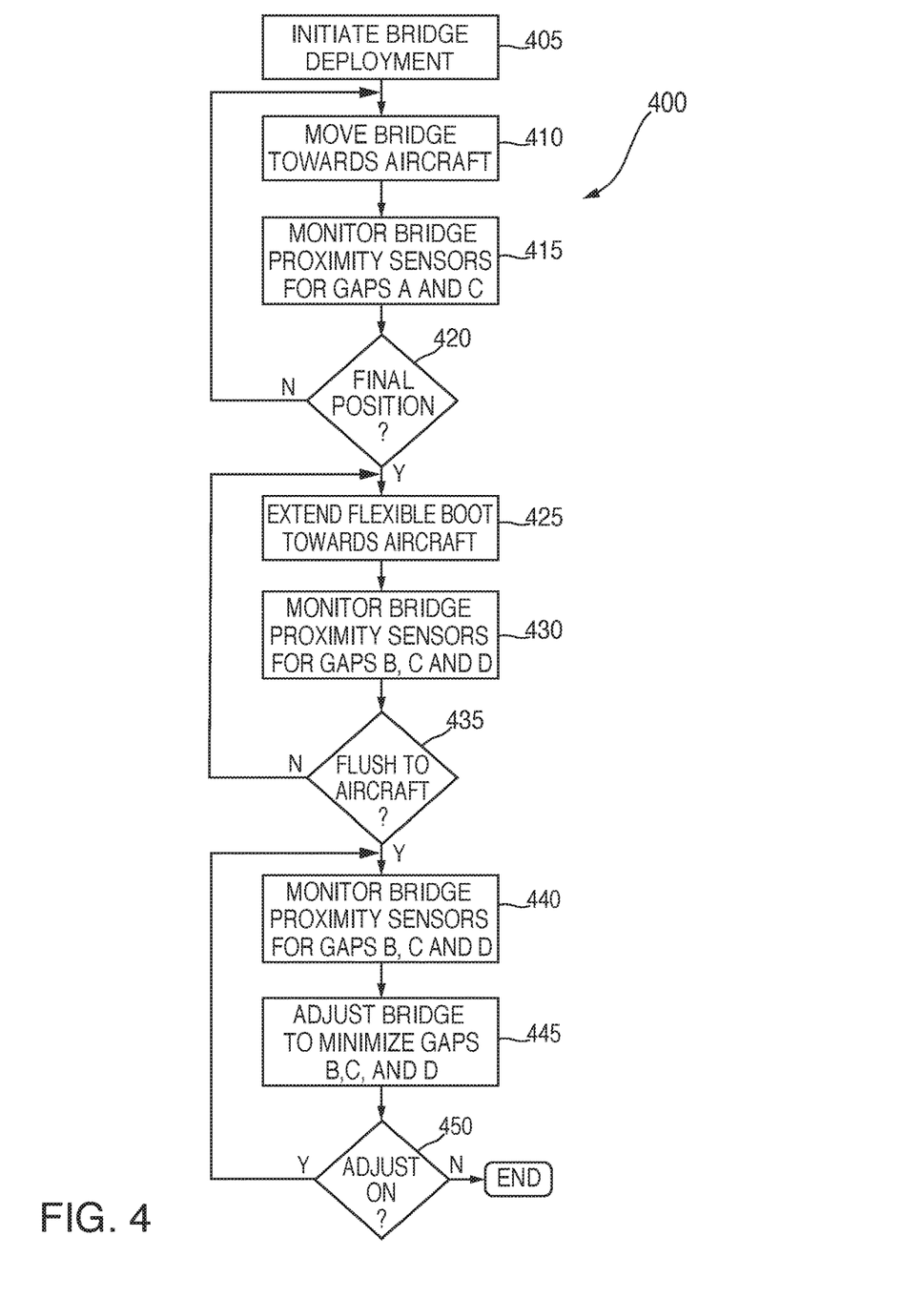
FIG. 4 is a flowchart of the automated deployment system for a passenger boarding bridge according to an embodiment of the present disclosure.

Referring now to FIG. 4, a flowchart 400 is shown that demonstrates the operation of system 100 in FIG. 1. The deployment (extension) of the cabin of the passenger boarding bridge is initiated at step 405. As discussed above, deployment may occur automatically based on input from aircraft position sensors 105 (which detect when the aircraft comes to rest at the gate). In one alternative, deployment may be initiated by a control signal transmitted from the aircraft. In another alternative, deployment may be initiated based on an airport worker's manual entry of a command at the user controls in the cabin of the passenger boarding bridge. As one of ordinary skill in the art, a system may provide one or more of such deployment methods in practice, depending the application. After initiation of deployment, the cabin of the passenger boarding bridge is moved towards the aircraft at step 410. During this movement process, the proximity sensors used to measure Gap A 320 and Gap C 340 (FIGS. 3A and 3B) are monitored, step 420.

At decision block 420, it is determined whether Gap A 320 and Gap C 340 has reached the desired final position (e.g., within a predetermined distance from the aircraft). If not, the movement of the cabin (step 410) and monitoring of Gap A 320 and Gap C 340 continues. If so, processing moves to step 425 where the flexible boot 305 (e.g., FIG. 3B) is extended toward the aircraft 310. During this extension process, the proximity sensors used to measure Gap B 320, Gap C 340, and Gap D 350 (FIG. 3B) are monitored, step 430. At decision block 420, it is determined whether flexible boot 305 is flush against aircraft 310. If not, steps 425 and 430 are repeated. If so, the main extension phase is complete and the passenger disembarking process may begin.

According to flowchart 400 in FIG. 4, processing next moves to the micro-adjustment phase that is discussed briefly above. The micro-adjustment phase operates continuously until boarding is complete and the initiation of the retraction of passenger boarding bridge. During this micro-adjustment phase, Gap F 360, Gap G 370, and Gap H 380 are monitored to ensure that the flexible boot 305 remains flush against aircraft 310 (step 440). Since Gap F 360, Gap G 370, and Gap H 380 are expected to be at a minimum when step 440 is first initiated and to increase as passengers disembark and cargo is unloaded from aircraft 310, the cabin position of passenger boarding bridge 300 is adjusted at step 445 to minimize Gap F 360, Gap G 370, and Gap H 380. Note that this process repeats while the micro-adjust phase is activated (shown as the loop of decision block 450 in flowchart 400). Normally, the micro-adjust phase operates continuously during disembarking and subsequent loading of passengers and cargo, since the aircraft will typically move up vertically during the disembarking (and unloading) stage as the weight of the aircraft drops and may move down vertically during the loading stage as the weight of the aircraft increases. The micro-adjust stages is deactivated when the aircraft is ready for take-off.

Although FIGS. 1 to 4 discuss a particular application of the system and method of the present disclosure for use in the passenger boarding bridges used to dock with aircraft in airport terminals, the system and method of the present disclosure has application in many other areas, including, for example, in terminals where passenger ferries and cruise ships dock. In fact, the system and method of the present disclosure can be used to enhance the operation of any extendible bridge structure, such as those used to unload cargo ships, for example. Furthermore, while the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A system for controlling a first actuator that actuates an extendible bridge structure and a second actuator that actuates an extendible cover mounted on a distal end of the extendible bridge structure for engaging a vehicle, the system comprising:
a receiver configured to receive sensor data from one or more proximity sensors; and
a processor configured to:
detect a position of the vehicle;
in response to determining that the vehicle is stationary, send a first control signal to the first actuator to cause the distal end of the extendible bridge structure to extend toward the vehicle;
determine, based on the sensor data received from the one or more proximity sensors, a distance from the distal end of the extendible bridge structure to the vehicle;
compare the distance to a target distance; and
in response to determining that the distance satisfies the target distance:
sending a second control signal to the first actuator to cause the distal end of the extendible bridge structure to stop extending toward the vehicle;
sending a third control signal to the second actuator to cause the extendible cover to extend against the vehicle;
determining a second distance from the extendible cover and the vehicle based on second sensor data received from the one or more proximity sensors; and
sending a fourth control signal to the second actuator to stop extending toward the vehicle based on the second distance.

2. The system of claim 1, wherein the processor is further configured to:
determine, based on the sensor data from the one or more proximity sensors, a change in an elevational position of the extendible cover relative to the vehicle after the extendible cover has been extended against the vehicle; and
send a fifth control signal, based on the determination of a change in the elevational position, to adjust the distal end of the extendible bridge structure in a vertical direction.

3. The system of claim 1, wherein the processor is further configured to:
receive a retraction signal to initiate retraction of the extendible bridge structure; and
send, in response to receiving the retraction signal, a fourth fifth control signal to the first actuator to cause the distal end of the extendible bridge structure to retract away from the vehicle.

4. The system of claim 1, wherein the fourth control signal is sent responsive to the second distance indicating that the extendable cover is flush against the vehicle.

5. The system of claim 1, further comprising an antenna coupled to the processor, wherein the processor is further configured to receive an activation signal via the antenna, wherein the extendible bridge structure is extended towards the vehicle in response to the activation signal.

6. The system of claim 1, further comprising:
a network interface card coupled to the processor and having an external interface coupled to a computer network; and
wherein the processor is configured to send the first control signal in response to an initiation signal received over the computer network via the network interface card.

7. The system of claim 1, wherein the one or more proximity sensors includes a first proximity sensor coupled to the extendable cover, and wherein the first proximity sensor moves when the extendable cover extends.

8. A system for controlling a first actuator that actuates an extendible passenger boarding bridge having a cabin and a second actuator that actuates a flexible boot mounted on a distal end of the cabin for engaging an aircraft, the system comprising:

a receiver configured to receive sensor data from one or more proximity sensors; and a processor configured to:
  detect a position of the aircraft;
  in response to determining that the aircraft is stationary, send a first control signal to the first actuator to cause the cabin of the extendible passenger boarding bridge to extend toward the aircraft;
  determine, based on the sensor data received from the one or more proximity sensors, a distance from the cabin to the aircraft;
  compare the distance to a target distance; and
  in response to determining that the distance satisfies the target distance:
    send a second control signal to the first actuator to cause the first actuator to stop extending the cabin;
    send a third control signal to the second actuator to cause the flexible boot to extend against the aircraft;
    determine a second distance from the flexible boot and the aircraft based on second sensor data received from the one or more proximity sensors; and
    send a fourth control signal to the second actuator to stop extending toward the aircraft based on the second distance.

9. The system of claim 8, wherein the processor is further configured to:
  determine, based on the sensor data from the one or more proximity sensors, a change in an elevational position of the flexible boot relative to the aircraft after the flexible boot has been extended against the aircraft; and
  send a fifth control signal, based on the determination of a change in the elevational position, to adjust the flexible boot in a vertical direction.

10. The system of claim 8, wherein the processor is further configured to:
  receive a retraction signal to initiate retraction of the extendible passenger boarding bridge; and
  send, in response to receiving the retraction signal, a fourth fifth control signal to the first actuator to cause the cabin to retract away from the aircraft.

11. The system of claim 8, wherein the processor is further configured to detect, based on the sensor data from the one or more proximity sensors, the aircraft at a predetermined distance from the extendible passenger boarding bridge, wherein the cabin is extended towards the aircraft in response to detection of the aircraft.

12. The system of claim 8, further comprising an antenna coupled to the processor, wherein the processor is further configured to receive an activation signal via the antenna, and wherein the cabin is extended towards the aircraft in response to the activation signal.

13. The system of claim 8, further comprising:
  a network interface card coupled to the processor and having an external interface coupled to a computer network; and
  wherein the processor is configured to send the first control signal in response to an initiation signal received over the computer network via the network interface card.

14. The system of claim 8, wherein the one or more proximity sensors comprise vision sensors, radar sensors, optical sensors, light detection and ranging (LIDAR) sensors, passive radio frequency identification (RFID) sensors, active RFID sensors, or Blue-Tooth® sensors.

15. A method for controlling a first actuator that actuates an extendible passenger boarding bridge and a second actuator that actuates a flexible boot mounted on a distal end of the extendible passenger boarding bridge for engaging a vehicle, the method, comprising:
  detecting a position of the vehicle;
  in response to determining that the vehicle is stationary, sending a first control signal to the first actuator to cause the distal end of the extendible passenger boarding bridge to extend toward the vehicle;
  determining, based on sensor data received from one or more proximity sensors, a distance from the distal end of the extendible passenger boarding bridge to the vehicle;
  comparing the distance to a target distance; and
  in response to determining that the distance satisfies the target distance:
    sending a second control signal to the first actuator to cause the distal end of the extendible passenger boarding bridge to stop extending toward the vehicle;
    sending a third control signal to the second actuator to cause the flexible boot to extend against the vehicle;
    determining a second distance from the flexible boot and the vehicle based on second sensor data received from the one or more proximity sensors; and
    sending a fourth control signal to the second actuator to stop extending toward the vehicle based on the second distance.

16. The method of claim 15, further comprising:
  determining, based on the sensor data from the one or more proximity sensors, a change in an elevational position of the flexible boot relative to the vehicle after the flexible boot has been extended against the vehicle; and
  sending a fifth control signal, based on the determination of a change in the elevation position, to adjust the flexible boot in a vertical direction.

17. The method of claim 15, further comprising:
  receiving a retraction signal to initiate retraction of the extendible passenger boarding bridge; and
  in response to receiving the retraction signal, sending a fourth fifth control signal to the first actuator to retract the extendible passenger boarding bridge away from the vehicle.

* * * * *

UNITED STATES PATENT AND TRADEMARK OFFICE
CERTIFICATE OF CORRECTION

Page 1 of 1

PATENT NO. : 10,519,614 B2
APPLICATION NO. : 15/633540
DATED : December 31, 2019
INVENTOR(S) : John W. Glatfelter and Brian D. Laughlin It is certified that error appears in the above-identified patent and that said Letters Patent is hereby corrected as shown below:

In the Claims

Column 8, Line 40, Claim 3, delete "fourth".

Column 9, Line 41, Claim 10, delete "fourth".

Column 10, Line 54, Claim 17, delete "fourth".

Signed and Sealed this
Fifth Day of May, 2020

Andrei Iancu
*Director of the United States Patent and Trademark Office*